(12) United States Patent
Acuna et al.

(10) Patent No.: US 8,291,268 B2
(45) Date of Patent: Oct. 16, 2012

(54) APPARATUS, SYSTEM, AND METHOD TO PROVIDE ALERT NOTIFICATION WITH RECONCILE ACTIONS

(75) Inventors: Jorge Daniel Acuna, Vail, AZ (US); Lourdes Magnally Gee, Tucson, AZ (US); Jason James Graves, Tucson, AZ (US); Kevan D. Holdaway, Raleigh, NC (US); Nhu Thanh Nguyen, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 12/417,519

(22) Filed: Apr. 2, 2009

(65) Prior Publication Data

US 2010/0257412 A1    Oct. 7, 2010

(51) Int. Cl.
*G06F 11/00* (2006.01)
(52) U.S. Cl. .......................... 714/48; 714/37
(58) Field of Classification Search ............ 714/48
See application file for complete search history.

(56) References Cited

U.S. PATENT DOCUMENTS

| | | | |
|---|---|---|---|
| 6,757,689 B2 | 6/2004 | Battas et al. | |
| 6,931,357 B2 | 8/2005 | Richard et al. | |
| 7,016,742 B2 | 3/2006 | Jarrell et al. | |
| 7,194,451 B2 | 3/2007 | Chaudhuri et al. | |
| 7,594,003 B2* | 9/2009 | Davidson et al. | 709/219 |
| 7,774,542 B2* | 8/2010 | Zhang et al. | 711/114 |
| 2005/0262136 A1 | 11/2005 | Lloyd et al. | |
| 2006/0053178 A1* | 3/2006 | van Ingen et al. | 707/204 |
| 2006/0053182 A1* | 3/2006 | Sen et al. | 707/204 |
| 2006/0053347 A1* | 3/2006 | van Ingen et al. | 714/47 |
| 2006/0085306 A1 | 4/2006 | Schulte et al. | |
| 2006/0101508 A1* | 5/2006 | Taylor | 726/7 |
| 2007/0011401 A1* | 1/2007 | Zhang et al. | 711/114 |
| 2007/0014244 A1* | 1/2007 | Srinivasan et al. | 370/252 |
| 2009/0024724 A1* | 1/2009 | Hirai | 709/223 |
| 2009/0150723 A1* | 6/2009 | Bennett et al. | 714/30 |
| 2009/0183023 A1* | 7/2009 | Rathunde et al. | 714/4 |
| 2010/0121978 A1* | 5/2010 | McDaniel et al. | 709/238 |
| 2010/0127881 A1* | 5/2010 | Schechter et al. | 340/584 |

OTHER PUBLICATIONS

Nicolaou, "An architecture for real-time multimedia communication systems," Selected Areas in Communications, IEEE Journal, Apr. 1990, pp. 391-400, vol. 8, Issue 3.
Burns et al., "The Ravenscar Tasking Profile for High Integrity Real-Time Programs," Reliable Software Technologies—Ada-Europe, 1998, p. 263, vol. 1411, Springer Berlin/Heidelberg.

\* cited by examiner

*Primary Examiner* — Kamini Patel
(74) *Attorney, Agent, or Firm* — Dale F. Regelman; Quarles & Brady LLP

(57) ABSTRACT

A method to provide an alert notification and a reconcile action to a client computing system, the alert notification being responsive to an error condition in a target computing system, and the reconcile action being responsive to the alert notification, wherein the method supplies a client computing system and a target computing system, wherein the target computing system is in communication with the client computing system. The method further forms an alert notification responsive to an error condition detected in the target computing system, and generates a reconcile action responsive to the alert notification. The method provides the alert notification and the reconcile action to the client computing system. The client computing system returns a selected reconcile action, which is implemented by the target computing system, wherein that implementing step is performed without logging into said target computing system.

25 Claims, 10 Drawing Sheets

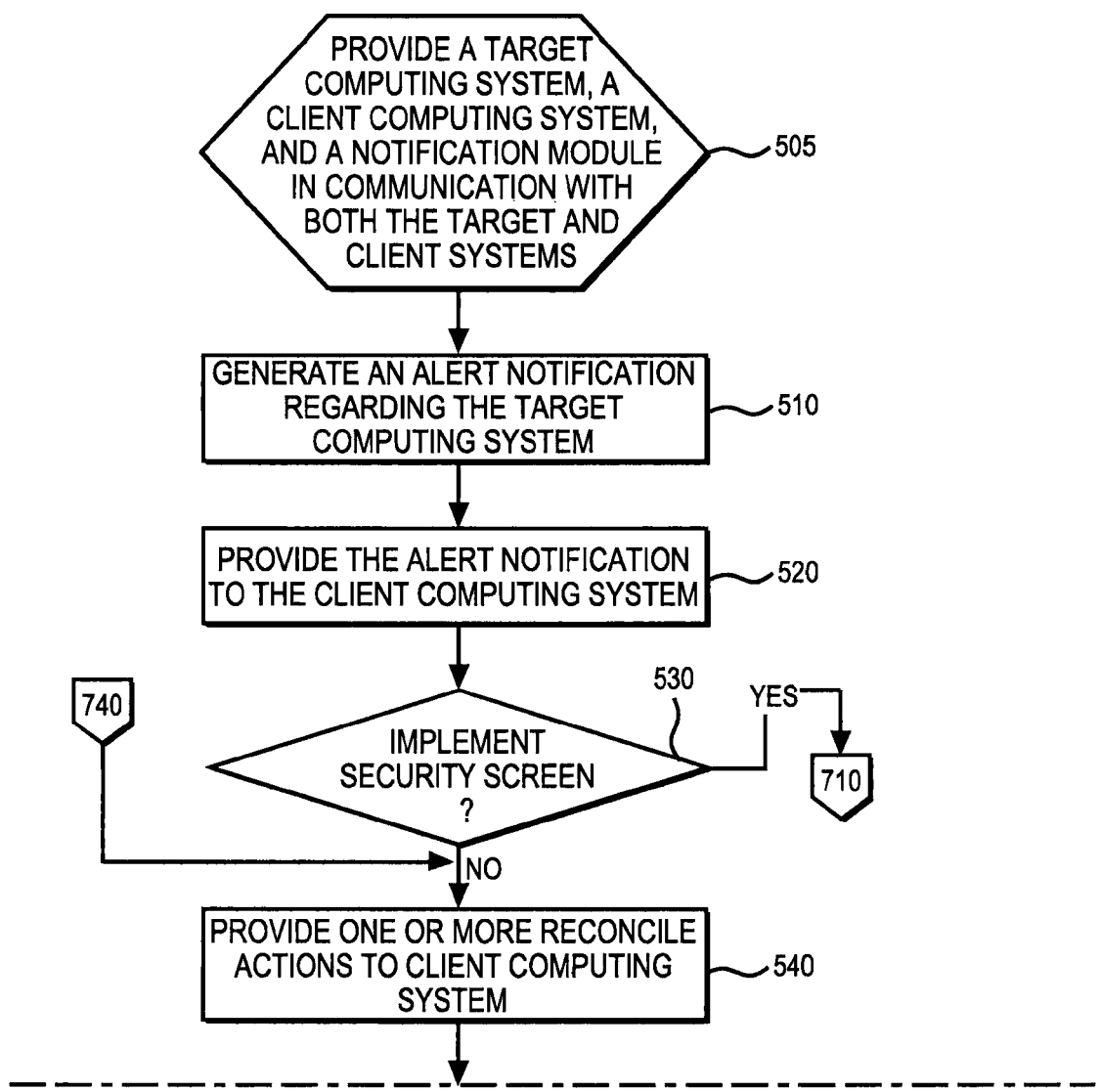

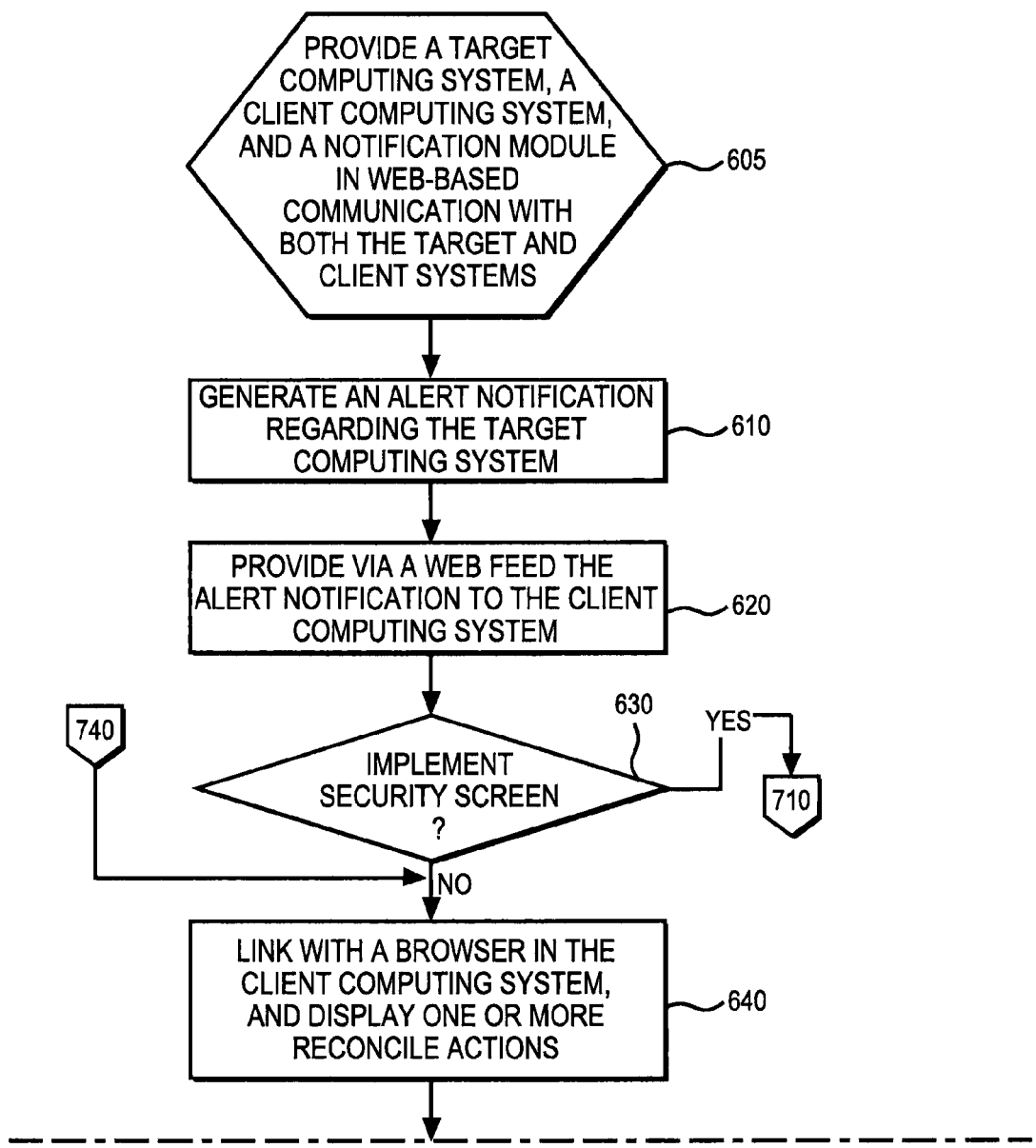

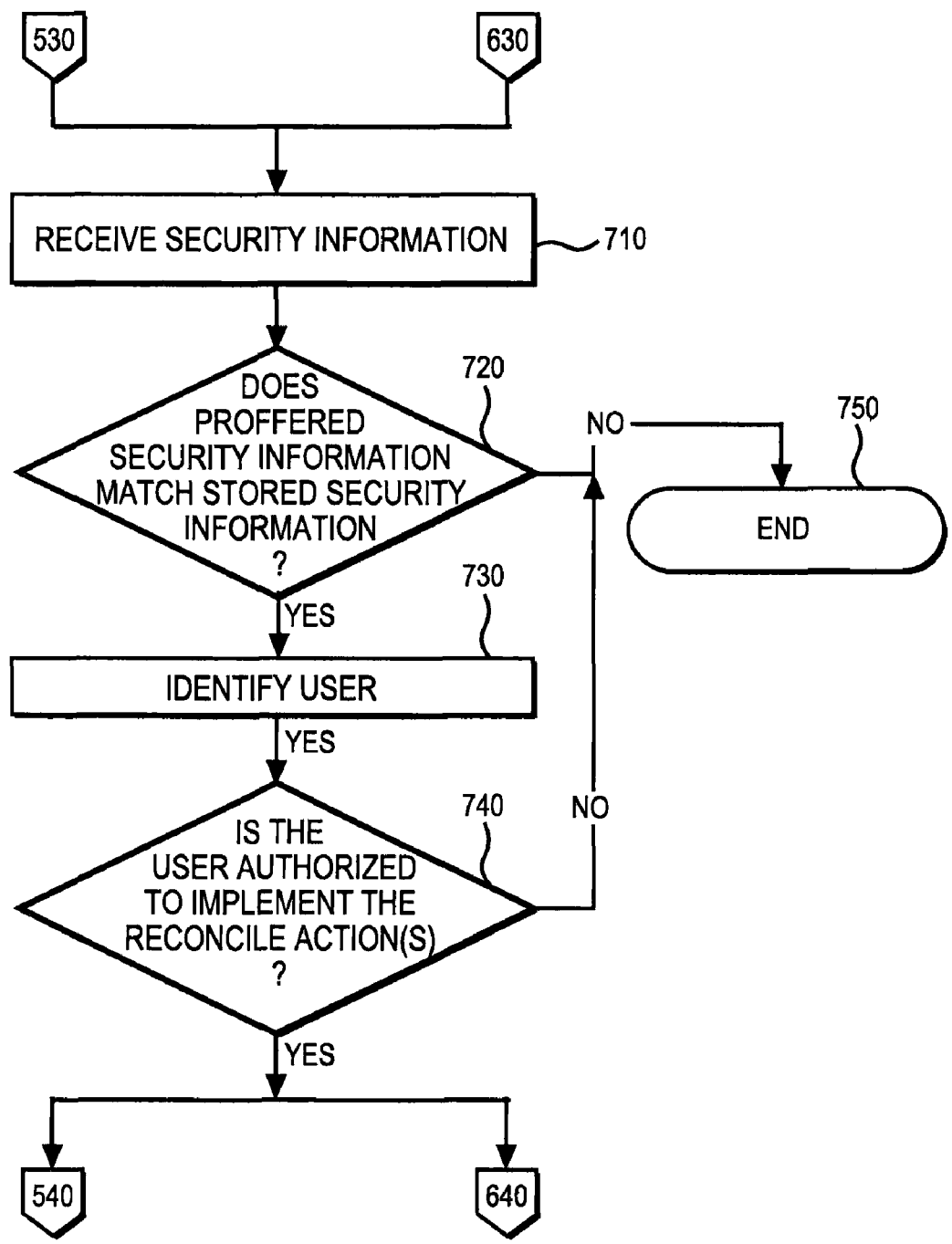

APPARATUS, SYSTEM, AND METHOD TO PROVIDE ALERT NOTIFICATION WITH RECONCILE ACTIONS

FIELD OF THE INVENTION

This invention relates to an apparatus and method to provide alert notification in combination with one or more reconcile action.

BACKGROUND OF THE INVENTION

A storage management system includes a storage device that stores data for a host. The storage device may be a hard disk drive, magnetic tape drive, optical storage device, micromechanical storage device, holographic storage device, and/or semiconductor storage device. The host may be a computer workstation, server, mainframe computer, and the like.

The storage management system manages the data flow being communicated between the host and the storage device. Sometimes an event or error occurs in the system that requires notification. For example, the storage device may temporary lose power while writing data to a storage medium. When this occurs, the storage management system may alert a user or customer of this event. The alerts may be in the form of emails, system logs, simple network management protocol (SNMP traps, etc.) Once notified of the error, the customer will log back into the system to determine what corrective action needs to be performed in response to the system error.

SUMMARY OF THE INVENTION

From the foregoing discussion, there is a need for an apparatus, system, and method that provides users with notification of storage systems' alerts and the capability to offer reconcile actions in real time. Accordingly, the present invention has been developed to provide an apparatus, system, and method for dynamically linking storage system alerts with a corrective course of action in real time. Beneficially, such an apparatus, system, and method would alleviate the need to log back into the system and perform the corrective actions, thereby, saving time, money, and resources.

Applicants' invention comprises an apparatus and method to provide an alert notification and a reconcile action. The method supplies a client computing system and a target computing system, wherein the target computing system is in communication with the client computing system. The method further forms an alert notification responsive to an error condition detected in the target computing system, and generates a reconcile action responsive to the alert notification. The method provides the alert notification and the reconcile action to the client computing system. The client computing system returns a selected reconcile action, which is implemented by the target computing system, wherein that implementing step is performed without logging into said target computing system.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention dynamically provides and/or links alerts and events notifications to real time corrective action items. Beneficially, the present invention enables a real time corrective response to notifications. In addition, the present invention enables efficient communication between a storage system and a client system so the appropriate corrective action may be performed in response to the notification. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A is a flow chart summarizing certain steps in one embodiment of Applicants' method;

FIG. 6A is a flow chart summarizing certain steps in a second embodiment of Applicants' method;

FIG. 7 is a flow chart summarizing certain optional steps used in the various embodiments of Applicants' method.

DETAILED DESCRIPTION OF THE PREFERRED EMBODIMENTS

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
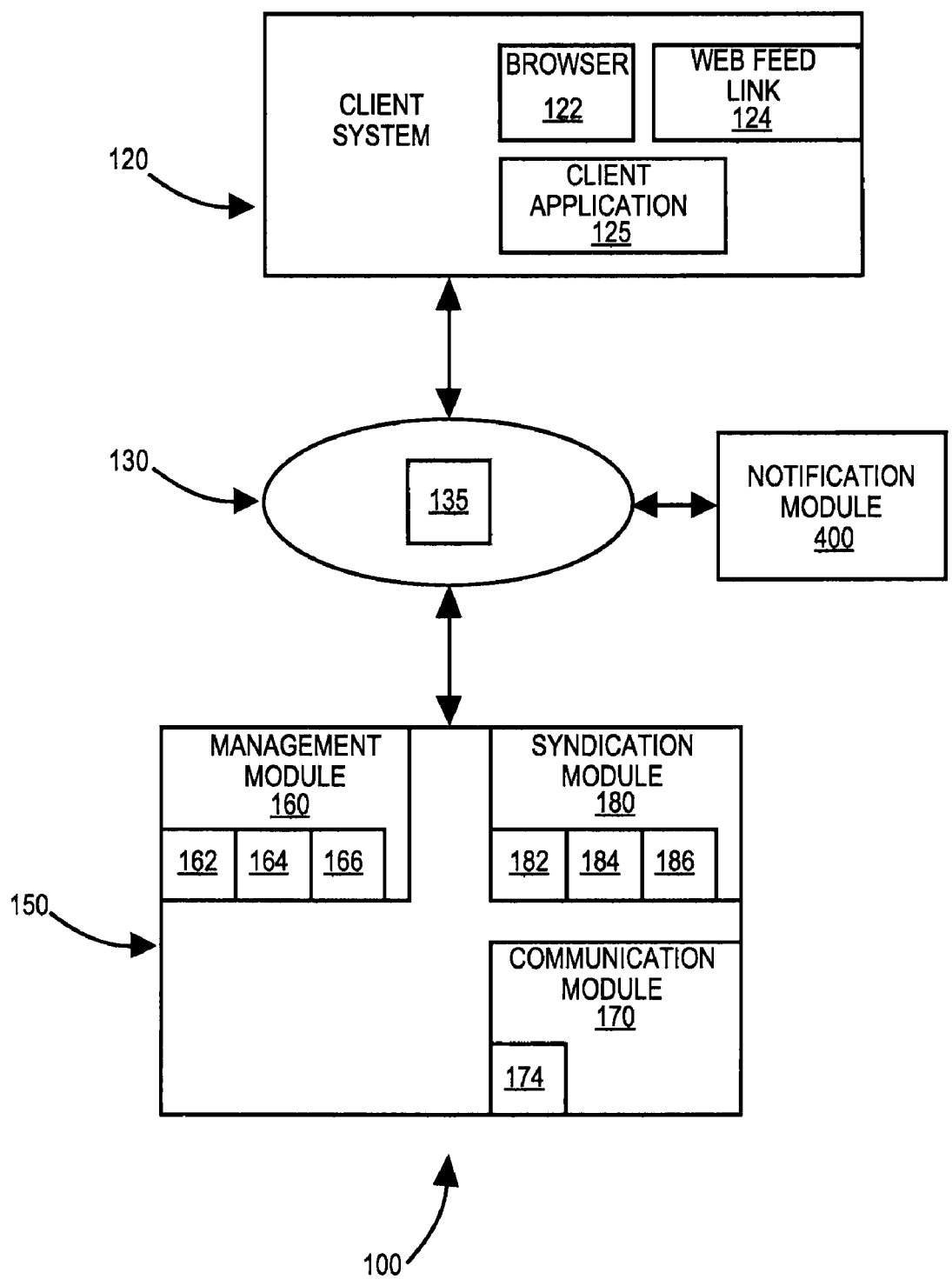
FIG. 1A is a block diagram illustrating a system in which one embodiment of the present invention may be implemented.

FIG. 1A is a schematic block diagram illustrating an embodiment of a computing system 100 for dynamically linking a notification (e.g., alert) with a corrective course of action in accordance with the present invention. System 100 includes a fabric 130, a client system 120, a notification module 400, and a target system 150. The client system 120, the notification module 400, and the target system 150, communicate with each other via fabric 130. The system 100 may include one or more client system 120, a target system 150, and a fabric 130. Although, for simplicity only one (1) client system 120, one (1) target system 150, and one (1) fabric 130 are shown, any number of client systems 120, target systems 150 and networks 130 may be used in the system 100. In certain embodiments, system 100 may correspond to a storage management system, such as the ones illustrated in FIGS. 2 and 3.

In certain embodiments, fabric 130 includes, for example, one or more switches 135. In certain embodiments, those one or more switches 135 include one or more conventional router switches. In the illustrated embodiment of FIG. 1, one or more switches 135 interconnect host client system 120 and target system 150 using any type of I/O interface, for example, a Fibre Channel ("FC"), Infiniband, Gigabit Ethernet, Ethernet, TCP/IP, iSCSI, SCSI I/O interface, or one or more signal lines used by a FC switch 135 to transfer information through, to, and from target system 150, and client system 120.

The client computing system 120 may include any suitable computational device including for example, a host computer, a personal computer, a workstation, a mainframe, a hand held computer, a palm top computer, a telephony device, a network appliance, a server, etc. In one embodiment, client system 120 comprises a hand held computer, such as personal digital assistants (PDA). In another embodiment, client system 120 comprises a telephony device, such as a mobile device, like a cell phone.

The target system 150 may include any suitable computational device including for example, a personal computer, a workstation, a mainframe, a storage device, a network appliance, a blade computer, a storage server, etc. In certain embodiments, target system 150 may comprise a storage system, such as storage system 250 (FIG. 2) or storage system 350 (FIG. 3). In one embodiment, target system 150 includes a storage system, such as an Enterprises Storage System ("ESS") from IBM Corporation.

The fabric 130 coupling the client system 120, the target system 150, and the notification module 400 together may include a Local Area Network (LAN), Wide Area Network (WAN), Storage Area Network (SAN), the Internet, an Intranet, wireless network, etc, or combinations thereof. Communication between any of the components or systems (e.g., client system 120, target system 150, and notification module 400) may be in the form of executable instructions, requests for action, data transfers, status, etc. The fabric 130 may comprise one or more nodes that may provide one or more physical and/or logical paths for transferring the data.

As illustrated in FIG. 1A, the client system 120 includes a browser 122, such as a web browser application, a client application 125, and a web feed link 124, such as a Really Simple Syndication ("RSS") feed link. In certain embodiments, the client application 125 may include a calendar application, email client, system logs, and simple network management protocol (SNMP) traps. In one embodiment, client application 125 includes an email client and calendar, such as LOTUS NOTES and LOTUS NOTES CALENDAR (LOTUS NOTES is a registered trademark of IBM).

The target system 150 includes a management module 160, a Communication Module 170, and a syndication module 180. In certain embodiments, Communication Module 170 comprises a plurality of notification messages 174 encoded in a computer readable medium.

In certain embodiments, the management module 160 comprises a processor 162, a plurality of reconcile actions 164 encoded in a computer readable medium wherein each reconcile action includes at least one course of action to correct a problem, error, and/or event occurring on the target system 150, and instructions 166 encoded in a computer readable medium wherein processor 162 utilizes instructions 166 to implement some or all of the steps of Applicants' method.

In certain embodiments, the syndication module 180 comprises a RSS file 184.

The notification module 400 may take the form of an entirely hardware embodiment, an entirely software embodiment or an embodiment containing both hardware and software elements. A software embodiment can include but is not limited to firmware, resident software, microcode, etc. Furthermore, the notification module 400 may take the form of program instructions or code stored by a computer-readable medium for use by or in connection with a computer or any instruction execution system. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk (e.g., CD-ROM, DVD, etc.).

In certain embodiments, the notification module 400 provides to client system 120 a notification alert 174 received from Communication Module 170, with a real time reconcile action 164, received from Management Module 160, such that a user may select an appropriate course of action to correct the error condition on the target system 150. In certain embodiments, the notification module 400 may utilize the Really Simple Syndication (RSS) environment to notify the client system 120 of an event or alert occurring on the target system 150 along with a reconcile action in response to the event or alert.

In certain embodiments, the notification module 400 may include a plug-in application. As a plug-in application, the notification module 400 interacts with and enhances features and/or functions in other applications, such as client application 125.

In certain embodiments, the notification module 400 may include a stand-alone update delivery application, such as IBM Standard Software Installer (ISSI) software like IBM EZUpdate program. As a stand-alone application, the notification module 400 interacts with and enhances the ISSI EZUpdate software to automatically notify a user of the client system 120 of alert notification(s) 174 from the target system 150.

Figure 4:
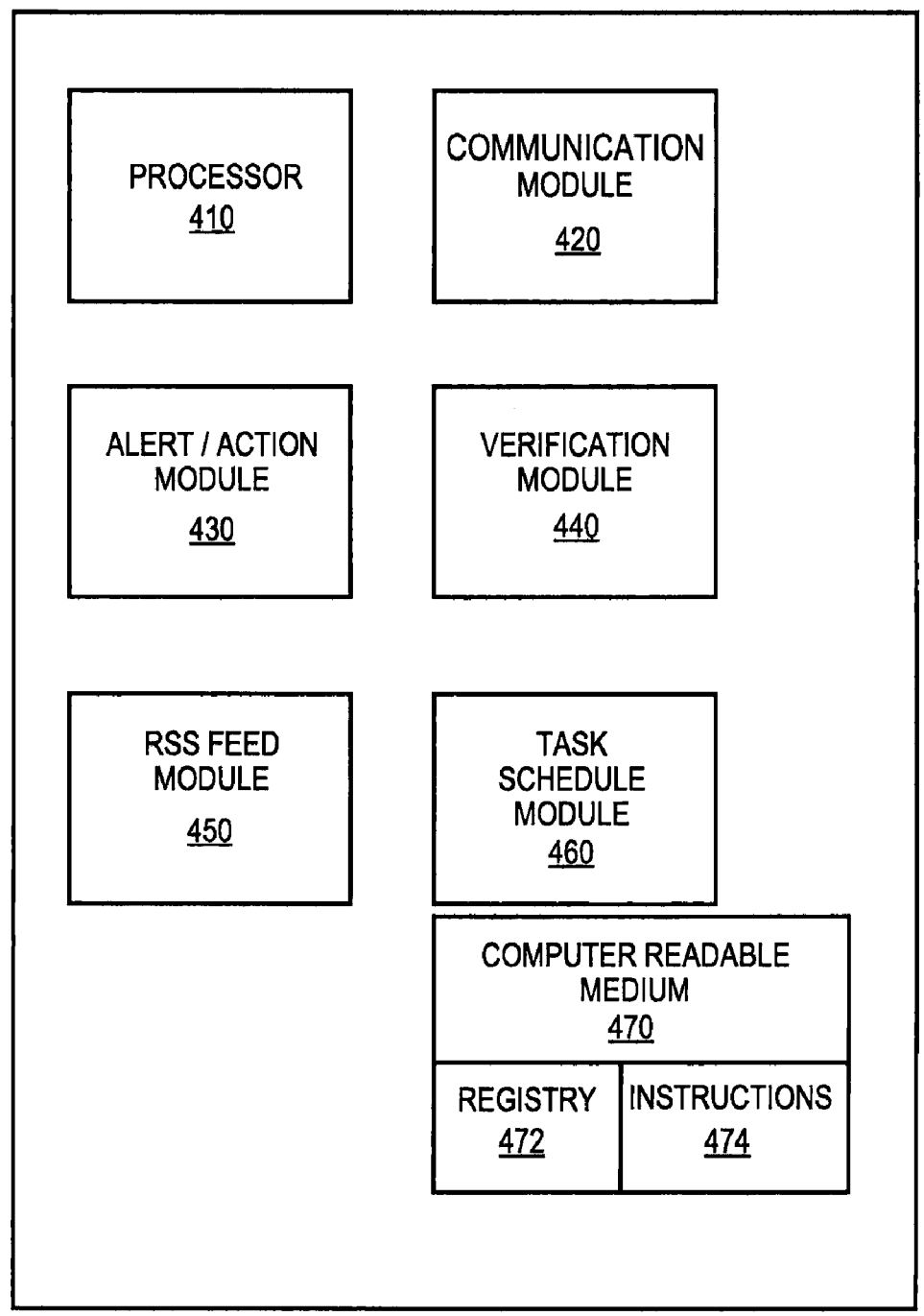
FIG. 4 is a block diagram illustrating one embodiment of Applicants' notification module.

For example, the notification module 400 may check against a list of alert notification updates on ISSI. If any such alert notification, or updates, are found, the ISSI EZUpdate user interface may be started to present a user of the client system 120 with a list of alert notification(s) 174 from which the user may choose what alert notification(s) 174 need immediate attention and what alert notification(s) 174 to defer until a later time. In this list, for example, those alert notification(s) 174 requiring immediate attention are marked with a higher priority than other alert notification(s) 174, which may be deferred until a later time. As other alert notification(s) 174 from the target system 150 are applied to the client system 120, the notification module 400 records this information (e.g., alert notification(s) 174) in a client system registry 472 (FIG. 4). The notification module 400 compares this information with the list of alert notification(s) 174 maintained by ISSI to determine if any new alert notification(s) 174 are needed. If no new alert notification(s) 174 are available, the notification module 400 may not be activated until the next cycle.

Figure 1B:
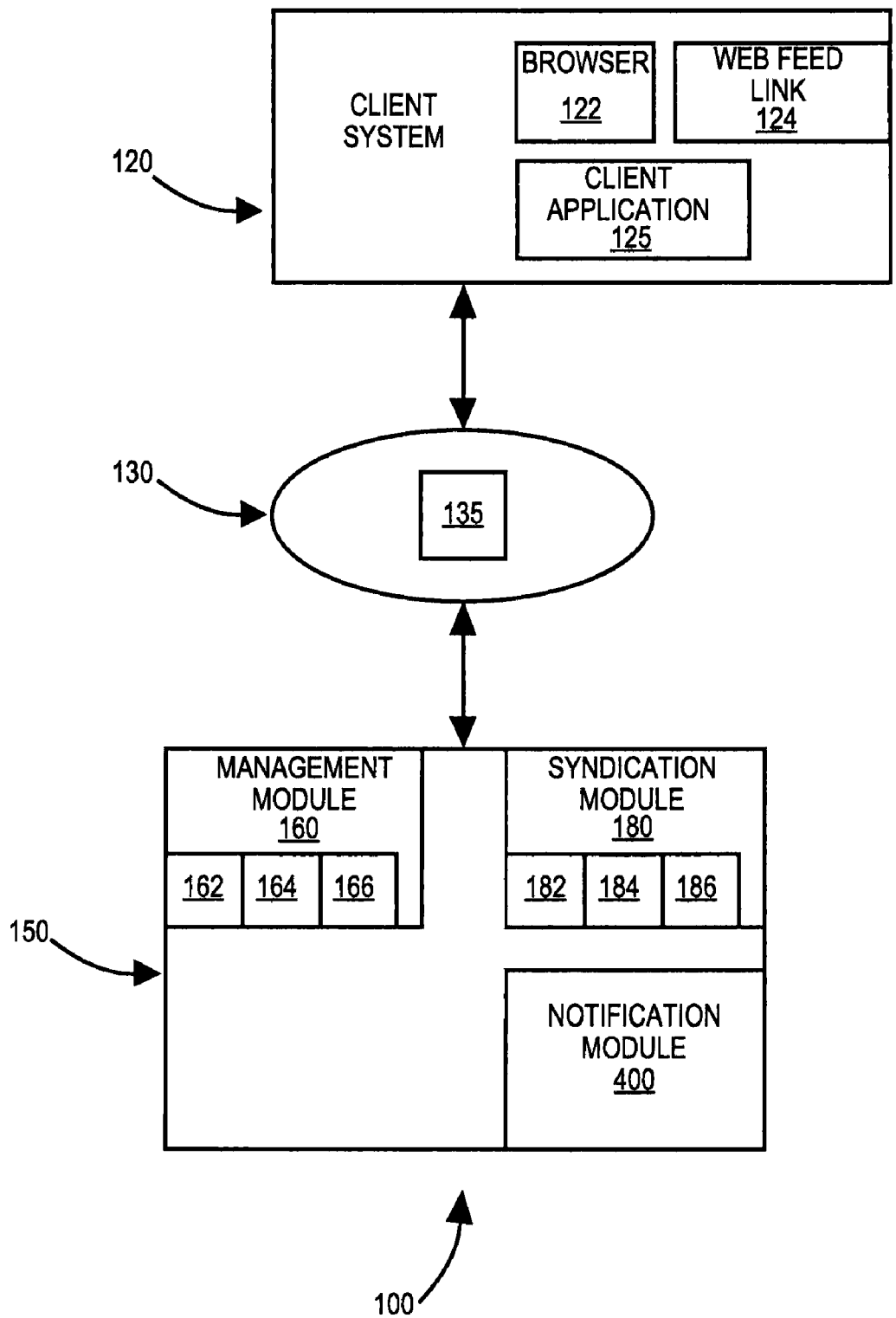
FIG. 1B shows the system of FIG. 1A wherein a Notification Module is integral with a client computing system.

FIG. 1B shows the Notification Module 400 integral with target computing system 150.

Figure 2:
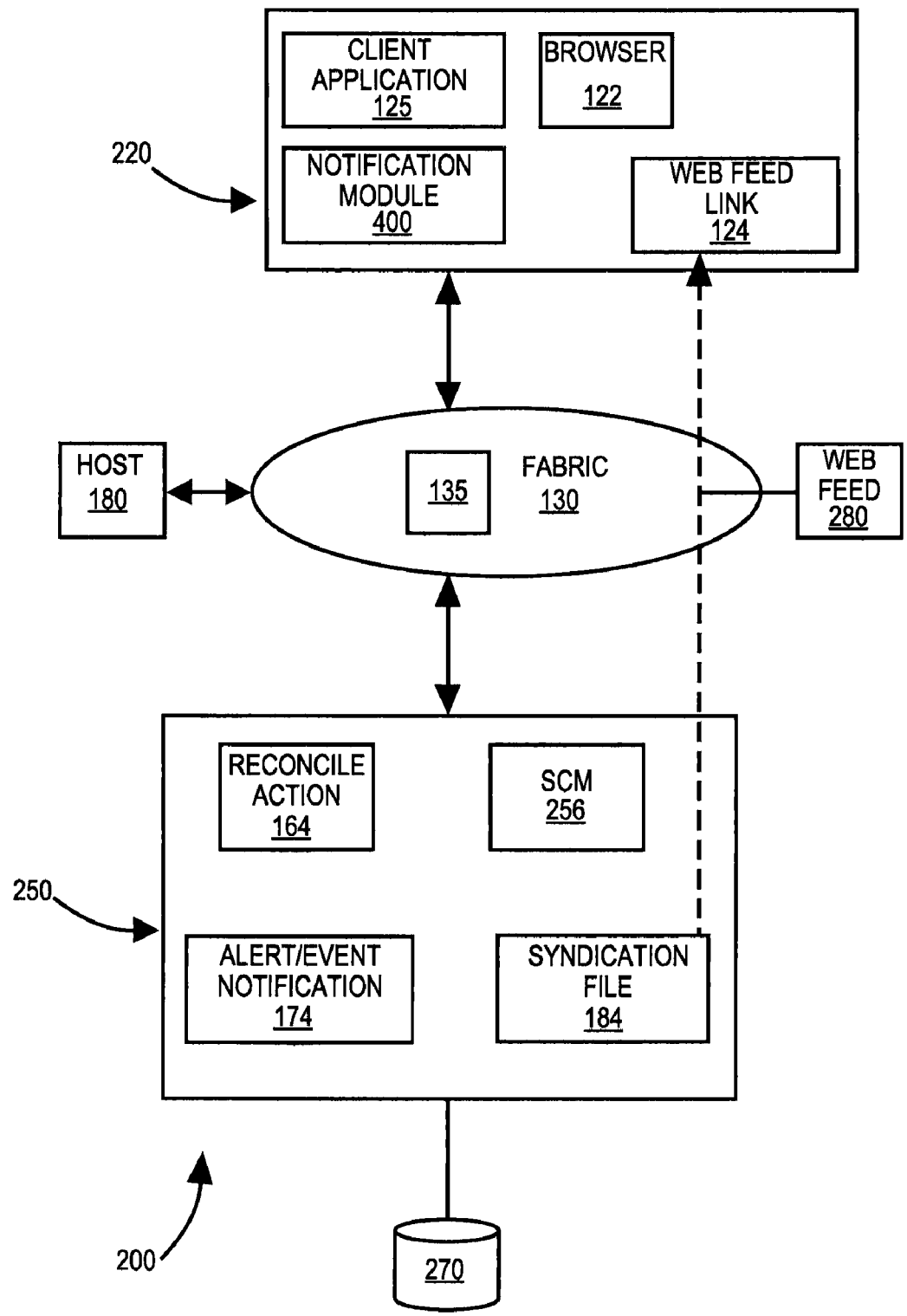
FIG. 2 is a block diagram illustrating a first storage system in which certain embodiments of the present invention may be implemented.
Figure 3:
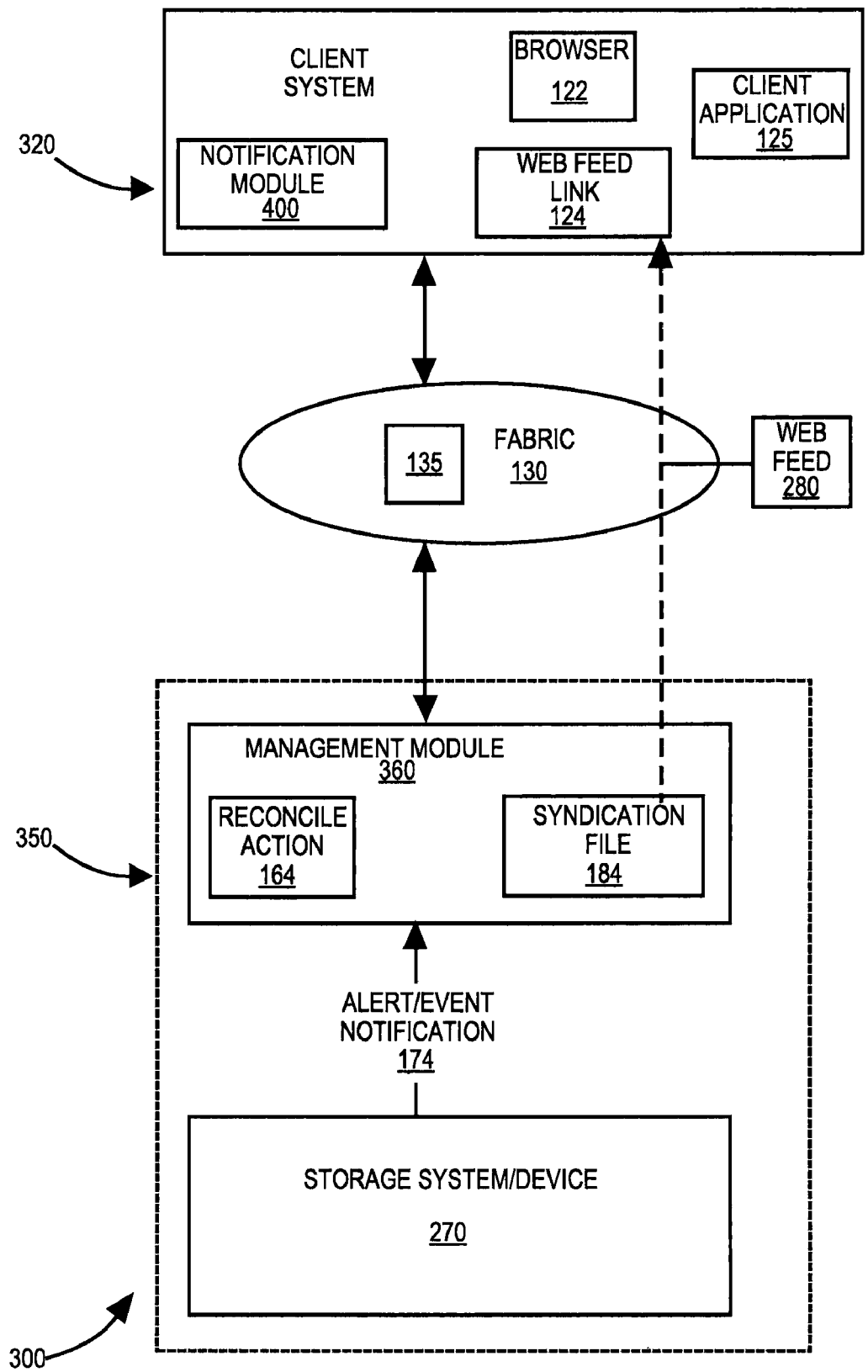
FIG. 3 is a block diagram illustrating a second storage system in which certain embodiments of the present invention may be implemented.

FIG. 2 illustrates system 200 for dynamically linking a storage system notification 174 (e.g., alert and/or event) with a reconcile action 164 (e.g., a suggestive course of action to fix or resolve the error condition) in accordance with the present invention. The system 200 substantially corresponds to the system 100 in FIG. 1. Accordingly, like numbers refer to like elements.

As illustrated in FIG. 2, system 200 includes a host 180, a client system 220, a notification module 400, and a storage system 250, in communication with one another via fabric 130. In certain embodiments, system 200 may comprise one or more hosts 180, storage systems 150, client systems 120, notification modules 400, fabrics 130, and/or combinations thereof.

In certain embodiments, host 180 comprises a computer system, such as a mainframe computer, personal computer, workstation, and combinations thereof, including an operating system such as Windows, AIX, Unix, MVS, LINUX, etc., (Windows is a registered trademark of Microsoft Corporation; AIX is a registered trademark and MVS is a trademark of IBM Corporation; and UNIX is a registered trademark in the United States and other countries licensed exclusively through The Open Group).

Host 180 submits an input/output (I/O) request to storage system 250. For example, the host 180 may communicate critical data and system commands over the communication fabric 130 to storage system 250. The storage system 250 may write information received from the host 180 to storage device/storage medium 270. The storage system 250 may store data for more than one host 180. The host 180 may communicate via unidirectional and/or a bi-directional path with the storage system 250 over the fabric 130 to store and/or access the data encoded in data storage device/medium 270. The communication between the hosts 180 and the storage system 250 through fabric 130 may be through cables or wire lines such as Ethernet cables, Fiber optic cables, coaxial cables, Fiber channels, FICON, and/or by wireless communication.

In certain embodiments, the host 180 comprises an IBM S/390 type computer or other computers. In certain embodiments, client system 120 comprises host 180. In other embodiments, the host 180 is couple to client system 120 via fabric 130. For example, in certain embodiments, client system 220 may comprises a hand held computer, a PC, a palm top computer, or a telephony device that communicates with either one or both the host 180 and storage system 250 via fabric 130.

In certain embodiments, storage system 250 comprises a BLADECENTER With Storage and/or ENTERPRISE STORAGE SYSTEM, such as a TOTALSTORAGE ENTERPRISE STORAGE SERVER DS6000 or DS8000, sold in commerce by International Business Machines Corporation. In certain embodiments, storage system 250 is in communication with one or more optical storage media, one or more magnetic storage media, one or more electronic storage media, and/or combinations thereof.

In certain embodiments, storage system 250 is in communication with one or more storage devices 270, such as a hard disk drive, magnetic tape drive, optical storage device, micro-mechanical storage device, holographic storage device, semiconductor storage device, and the like. In certain embodiments, storage device 270 comprises a plurality of data storage medium configured as just a bunch of disks (JBOD) array, a redundant array of independent disks (RAID), a tape library, a storage subsystem, a tape backup, a tape library, a compact disk read only memory (CD ROM) library, and the like In the illustrated embodiment of FIG. 2, the client system 120 includes browser 122, client application 125, RSS feed link 124, and notification module 400.

In certain embodiments, the notification module 400 is implemented or deployed as a plug-in application to the client application 125. In certain embodiments, the notification module 400 is implemented or deployed as a stand-alone application, such as ISSI EZUpdate from IBM Corporation.

In the illustrated embodiment of FIG. 2, storage system 250 comprises RSS file 184, Storage Configuration Manger (SCM) 256, and the alert notification application 174, which generates an alert when a problem occurs at the storage system 250. For example, the alert notification 174 generates an alert message identifying an error condition needing immediate attention. In certain embodiments, the alert notification 174 generates a reconcile action(s) 164 to resolve or fix the error condition occurring on the storage system 250. In certain embodiments, the alert notification 174 generates an RSS file 184 that includes the alert message and the reconcile action(s) 164. In certain embodiments, the storage system 250 feeds the RSS file 184 via the RSS feed 280 to the web feed link 124 of the client system 120.

The notification module 400 is configured to dynamically link and provide the alert notification 174 with the reconcile action 164 in real time so that a user of client system 120 has the ability to take immediate corrective action to the alert. In certain embodiments, notification module 400 provides reconciling actions for storage system errors in real time. In certain embodiments, notification module 400 dynamically links the RSS file 184 with the browser 122 such that a drop down menu of a current alert condition is displayed along with a reconcile action in the browser 122. The reconcile action includes a corrective course of action(s) in response to the alert condition. Thus, certain embodiments of the notification module 400 alleviates the need to log back into the storage system 250 to perform the corrective action, which saves time, money, and resources and helps mitigate any potential data loss due to the system error.

FIG. 3 illustrates system 300 for dynamically linking or providing a system notification (e.g., alert) with a corrective course of action in accordance with the present invention. The system 300 includes many of the elements recited in system 200 and described hereinabove System 300 differs from system 200 in that the storage system 350 includes management module 360 in communication with storage device 270. The management module 360 receives an alert condition from storage device 270. The management module 360 packages the alert condition generated by the storage device 270 with a reconcile action 164 into the RSS file 184. The management server 360 communicates the RSS file 184 to the RSS feed link 124 of client system 120 via RSS feed 280.

FIG. 4 illustrates certain embodiments of Applicants' notification module 400. In certain embodiments, notification module 400 is deployed or implemented as a plug-in software application that communicates with client application 125 (e.g., LOTUS NOTES CALENDAR, emails, system logs, SNMP traps, calendars, etc.). For example, the notification module 400 interacts with the service features provided by the client application 125 or other applications being executed in computing system 100, 200, 300 (FIGS. 1-3). The service features provided by the client application 125 may include, but are not limited to, notifying, planning, managing, alerting, scheduling, etc.

In certain embodiments, notification module 400 may include a stand-alone update delivery application, such as IBM Standard Software Installer (ISSI) software like IBM EZUpdate program. As a stand-alone application, the notification module 400 interacts with and enhances the ISSI EZUpdate software to automatically notify a user of the client system 120 of alert notification(s) 174 and to provide real time reconcile actions(s) 164.

In certain embodiments, the notification module 400 runs concurrently with the client application 125 to immediately notify a user of error conditions occurring on target system 100, storage system 250, and/or storage system 350, and to provide one or more reconcile action(s) 164 in response to the event. In certain embodiments, the notification module 400 dynamically links a RSS file 184 with a browser 122 such that a drop down menu of the current alert condition 174 is displayed along with the reconcile action(s) 164 (e.g., corrective course of action(s)) in the browser 122.

In certain embodiments, the notification module 400 provides enhanced end-to-end integration and management of storage tasks by dynamically linking alerts with reconcile actions as those alerts occur. Thus, certain embodiments of the present invention allows a user to quickly analyze and resolve events occurring on the storage system without having to login back into the storage system.

Referring to FIG. 4, the notification module 400 includes a communication module 420, an alert/action module 430, a verification module 440, a RSS module 450, a task schedule module 460, and a computer readable medium 470.

In certain embodiments, modules 420-460 may share common data registers, memory, or the like. Although FIG. 4 depicts apparatus 400 as including modules 420-460, the executables of modules 420-460 need not be physically located together, but may comprise disparate instructions stored in different locations of a system (e.g., system 100, 200, 300) which when joined logically together, comprise one or more modules 410-460, and achieve the described functions for modules 420-460.

Modules 420-460 of apparatus 400 may be implemented or deployed in a computing system (e.g., systems 100, 200, 300) as executable code. Modules 420-460 may, for instance, comprise one or more physical or logical blocks of computer instructions which may, for instance, be organized as an object, procedure, or function. Modules 420-460 may be executable by a processor, such as a processor included in the client system 120, target system 150, host 180, management server 160, storage device 162, storage system 250 and/or combinations thereof. In certain embodiments, modules 420-460 may be executable by more than one processor within system 100, 200, or 300 (FIGS. 1-3).

In certain embodiments, modules 420-460 may comprise computer executable code stored on a computer readable medium such as a memory of a client system 120. The code may be executed by a processor such as a processor coupled to the client system 120. In other embodiments, the code may be stored in memory of target system 150 and executed by a processor coupled to target system 150. In yet other embodiments, the code may be stored in computer readable medium 470 and executed by a processor 410.

In certain embodiments, modules 420-460 are configured to interact with and use the features and/or functions provided by the client application 125 (e.g., a web browser, email client, calendar, system logs, SNMP traps, etc.) to provide certain functions "on demand".

For example, modules 420-460 may use a service feature (e.g., alert, event, notification, planning, scheduling, etc.) of the client application 125 (e.g., calendar or email) to notify a user of events, tasks, and/or alerts needing attention on the target system 150. In certain embodiments, the modules 420-460 may use a protocol to exchange data with the client application 125. For example, modules 420-460 may register with the client application 125 and use a protocol to exchange data relating to storage management tasks, events, errors, and problems in the target system 150 (e.g., FIGS. 1-3).

The communication module 420 receives an alert notification 174 from a target system 150. The alert notification 174 may be communicated over fabric 130 via normal network channels or by web feed 280. The alert notification 174 includes an alert message that relates to a problem, error, event, and/or task needing immediate attention. For example, the alert message may identify a drive failure, data migration problem, temperature failure, etc. occurring in the target system 150.

The communication module 420 notifies the client system 120 of the events and/or alerts occurring in the target system 150. The communication module 420 may provide real time notice by interacting with and enhancing the service features of the client application 125. For example, the client application 125 may include a calendar application, such as LOTUS NOTES CALENDAR, which includes notification features like scheduling an appointment or meeting. The communication module 420 interacts with and uses the calendar's notification features to alert a user of an event occurring on the target system 150. For example, the communication module 420 generates an alert message in the calendar to immediately notify the user there is a error condition in the target system 150.

In one embodiment, the communication module 420 generates an alert message in the email of client application 125 to notify the user of the event on the target system 150. In another embodiment, the communication module 420 generates both an alert message in the calendar of client application 125 and in the email of client application 125 to immediately notify the user of the alert notification 174 needing immediate attention.

The alert/action module 430 provides a real time selection of a suggested course of action to reconcile the event or problem occurring on the target system 150. The reconcile action(s) 164 may be a corrective action to respond to the error condition on the target system 150. The alert/action module 430 displays both the alert notification 174 with the reconcile action(s) 164 (e.g., a corrective course of action) in the notice being provided by the communication module 420.

For example, in an embodiment, a target system 150 generates and sends an alert notification 174 though fabric 130 to client system 120. The alert notification 174 includes the alert message identifying the error condition occurring on the target system 150. The target system 150 may also generate and send a reconcile action(s) 164 (e.g., a suggestive course of action(s)) to fix the error or problem. The communication module 420 notifies the client system 120 using the client application's 125 features. The alert/action module 430 dynamically links and immediately displays the alert notification 174 with the reconcile action(s) 164 in the notice being provided by the communication module 420. The alert/action module 430 provides in real time to a user or system administrator of the client system 120 the ability to immediately view the alert message with the reconcile action(s) 164 without having to log into the target system 150.

The alert/action module 430 selects a reconcile action 164 in response to the error condition and communicates the selected reconcile action 164 to the client system 120. The selection may be automatic or by user input. For example in one embodiment, module 430 utilizes a lookup table or database to match an alert notification 174 with an associated reconcile action 164. In another embodiment, a user may select a reconcile action 164 using the client system 120 input device, such as keyboard, touch screen, mouse, etc. Because the alert/action module 430 dynamically links the alert message with the reconcile action, the user may immediately select in real time the appropriate course of action without logging into the target system 150. Thus, allowing a user to quickly analyze and resolve events occurring on the target system 150 (e.g., storage system) without having to log back into the target system 150.

For example, the alert notification 174 may include an alert message such as "Enclosure temperature warning". A reconcile action(s) 164 may include a suggestive action, such as Action 1: "reduce drive activity" and Action 2: "Mask alert" (e.g., ignore). The alert/action module 430 dynamically links and displays the event (e.g., "Enclosure temperature warning") with the two reconcile actions 164 (e.g., Action 1 and Action 2) in the notice being provided by the communication module 420, so that an appropriate course of action (e.g., either Action 1 or Action 2) can be selected in real time.

In the above example, the communication module 420 notifies the user immediately in the client's calendar 125 of the alert notification 174 received from the target system 150 (e.g., storage system). Because the alert notification 174 appears in the client's calendar 125 with reconcile action(s) 164 dynamically linked to the error/event, the user can immediately select in real time (e.g., via alert/action module 430) which reconcile action to take (e.g., Action 1 or Action 2). The alert/action module 430 performs the selection of the reconcile action 164 and immediately communicates the selected reconcile action to the target system 150 where the selected reconcile action is implemented.

In one embodiment, the selection is automatically made by the alert/action module 430 based on a policy. The policy includes rules that govern which reconcile action is automatically selected based on which alert notification is received. For example, using the above temperature example, a user may generate a policy to automatically perform Action 1 when a temperature warning alert is received. The alert/action module 430 automatically selects Action 1 based on this policy.

The RSS module 450 subscribes to the alert notification 174 of the target system 150 using a web feed 280, such as Really Simple Syndication or Atom Syndication Format feed. In certain embodiments, the alert notification 174 is included in an RSS file 184 generated by the target system 150. In one embodiment, the management server 160 (FIG. 3) generates the RSS file 184 having the alert notification 174.

The RSS module 450 interacts with the RSS feed link 124 of the client system 120 to receive the alert notification 174 being communicate through the web feed 280. For example, in one embodiment, the RSS module 450 receives the RSS file 184 from the target system 150 via RSS Feed link 280. The RSS file 184 includes the alert notification 174 generated from the storage system 250.

In certain embodiments, the RSS module 450 uses the principles of a web syndication, such as a Really Simple Syndication (RSS) feed. For example, the RSS module 450 links with a drop down menu of browser 122 to display current alert conditions along with a corrective action(s) in the browser 122. Browser 122 may be a web browser based tool like Internet Explorer, Mozilla Firefox, Safari, Opera, and Netscape, etc., (Internet Explorer is a registered trademark of Microsoft Corporation; Mozilla Firefox is a registered trademark of Mozilla Foundation, and Netscape is a trademark of Netscape Corporation).

In certain embodiments, the RSS module 450 includes an RSS reader that reads the content of the RSS file 184. The RSS file 184 includes an RSS document containing the target system event/alert message. For example, the RSS file 184 is provided by entering the RSS feed link 124 into the RSS reader or by clicking an RSS icon in the browser 122 that initiates the subscription process. The RSS reader of RSS module 450 checks the target system's 150 subscribed feed (e.g., web feed 280) for new RSS files having alert notification 174 and downloads via the RSS module 450 any updates (e.g., events/alert messages) the RSS reader finds to the client system 120. The RSS document may include a summary, partial, or full text of the RSS file 184. In certain embodiments, the RSS module 450 may provide a consolidated view of the content of the RSS file 184 in a single browser display or desktop application of the client system 120.

Because the RSS module 450 establishes a direct web feed with the target system 150, the client system 120 immediately receives notice of the alert notification 174 with a reconcile action(s) 164 in real time.

In certain embodiments, the alert/action module 430 operates in conjunction with the RSS module 450 to dynamically link the alert notification 174 with the reconcile action(s) 164 so that a user may immediately view and select a reconcile action 164 in response to the alert message. For example, the RSS module 450 links with a drop down menu of the web browser based tool 122 of the client system 120. The alert/action module 430 displays in browser 122 the current storage alert conditions along with a suggested course of action to fix the storage problem. A user may select via alert/action module 430 (and/or RSS module 450) a reconcile action 164 in response to the storage alert or event being display in the browser 122. The alert/action module 430 (and/or RSS module 450) communicates immediately (via web feed 280 or fabric 130) the selected course of action to the target system 150, wherein the storage system 250 performs the selected course of action.

In certain embodiments, a user selects a policy on the target system 150 to generate the required RSS file 184 for the web feed 280. The selection of the policy is implemented using the RSS module 450, for example.

In certain embodiments, the target system 150, storage system 250, or management module 360, may issue the alert. In all of these embodiments, a target system provides alerts to the client system 120.

A verification module 440 verifies a user or a system administrator level of access to the alert notification 174 For example, in certain embodiments as an extra layer of security, the verification module 440 may prompt the user to enter security information before granting access to the alert notification 174.

In certain embodiments, the security information comprises a password. In certain embodiments, the password is accompanied by a user name. In some embodiments, several passwords and username/password combinations may be accepted.

In certain embodiments wherein more secure methods of confirming user identity are desired, the security information comprises a fingerprint. In other embodiments, the security information comprises an iris scan and/or a retinal scan. In yet other embodiments, the security information comprises a voiceprint. In yet other embodiments, the security information comprises a handwriting exemplar.

The security information is entered into the client system 120 and the verification module 440 verifies the level of access (e.g., permission) the user has to the alert notification 174. The verification module 440 may grant access to the appropriate alerts/actions notifications 174 based on applicable permission levels for the user. If the user does not have the appropriate level of permission for the particular alert notification 174, the notification module 440 may deny access or prevent the user from either viewing the alert notifications 174 and/or selecting a course of action in response to an alert.

In certain embodiments, when a user installs a management application 156, such as Storage Configuration Manger (SCM), the userID, password, and level of access to alert notifications 174 are established. In certain embodiments, the verification module 440 checks a database maintained by the target system 150 to determine the level of access.

In certain embodiments, the client system 120, target system 150, storage system 250, storage system 350, host 180, notification module 400, or combinations thereof, store the security information such as access, userID(s), passwords, and level of access and corresponding alert notifications, applicable permission levels, etc.

In one embodiment, the verification module 440 is operational when a user first installs a management tool, such as storage control manager. For example, during installation a userID and permissions may be established. The information (e.g., userID and password) is entered and stored in system 100, 200, or 300. For example, the information (e.g., userID and password) may be stored in the client system 120, target system 150, storage system 250, storage system 350, host 180, notification module 400, and/or combinations thereof.

In certain embodiments, when a user first opens the browser 122 with the RSS feed 124, the verification module 440 may request entry of the userID and password before selecting the link for the first time. After verification module 440 verifies the user has permission, the alert/action module 430 performs the appropriate alerts/actions. Because the browser 122 is open, the user may continue to receive constant updates of the target system 150 events via RSS module 450 by clicking on the RSS link 124. As the user selects via the alert/action module 430 the reconcile actions in response to the events, the corresponding alert/action link are remove from the feed 270 via the alert/action module 430.

In one embodiment, the RSS file links 124 may be encrypted using an encryption algorithm, such as Blowfish. To enable a user the capability to view the RSS feed 270, the verification module 440 may include special rules for the notification module 400. For example, notification module 400 as a plug-in may include a decryption algorithm. The decryption algorithm may be included in the verification module 440, for example.

The task schedule module 460 manages and schedules tasks (e.g., storage tasks, storage maintenance, reconcile actions 164, etc.) needing to be performed on the target system 150. The task schedule module 460 interacts with features provided by the client application 125 (e.g., scheduling, planning, managing, etc.) to permit a user to schedule tasks and designate a time to perform the task.

For example, the task schedule module 460 interacts with the client application 125, such as LOTUS NOTES and LOTUS NOTES CALENDAR, running or executing on the client system 120 to enable the managing and scheduling of tasks. In certain embodiments, the task schedule module 460 interacts with the Calendar to enable the scheduling of tasks based on policies being generated by user input. The tasks may correspond to storage management tasks or to a corrective action needing to be implemented in response to an event or alert message, such as reconcile actions 164. Once the task schedules are established, the communication module 420 displays the task schedules in the Calendar to notify a user when it is time to perform a task.

In certain embodiments, the notification module 400 may be a computer program product comprising the computer useable medium having the computer readable program embodying anyone or combination of the communication module 420, alert/action module 430, verification module 440, RSS feed module 450, and task schedule module 460. The computer readable program product may be stored on a tangible storage media and may be executed by a processor in the client system 120.

In operation, for example, the notification module 400 notifies a user of the client system 120 of the alert message using the notification features in the client application 125 (e.g., email, calendar, etc.). For example, the alert message appears in a Calendar application 125, such as LOTUS NOTES CALENDAR. The alert message includes a corresponding reconcile action to correct or fix the error/event on the target system 150. The corrective action is a suggested course of action to correct the error or event on the target system 150. The notification module 400 dynamically links the alert message with the reconcile action so that a user may view and select in real time which corrective action to take. The notification module 400 performs the selected reconcile action by directly communicating the selection to the target system 150.

In certain embodiments, the notification apparatus 400 provides the ability to immediately take a corrective action to an event or error in the alert message and avoids having to log back into the storage system 250 to perform the corrective action. The notification apparatus 400 also permits the user to immediately receive the event when it occurs with a suggestive reconcile action in the alert message. The notification module 400 manages a storage system environment, such as storage systems 150 and 250 of FIGS. 2 and 3, respectively, by providing a user a more accessible means to take corrective reconcile actions in response to alert notifications 174 Because the client system 120 may be configured as a PC, a PDA, a mobile phone, etc., the notification module 400 also enables that client system notification software 125, such as email and calendar, to execute the corrective action without having to log into the storage system 250. Thus, users and system administrators are not necessarily constrained to the storage management software and have a more convenient, faster, and easier means to manage their storage environment.

In certain embodiments, the notification apparatus 400 via alert/action module 430 provides a call-in number that enables the user to take advantage of automated actions by calling the number using a mobile phone, PDA(s) etc. In this embodiment, the alert/action module 430 may use a web-aware tool, such as a browser 122 being executed on the mobile phone or PDA to notify the end user of the alert notification 174 from the target system 150 and to provide the call-in number. The end user may dial the number to access an automated system being executed on the storage system 250, for example. The automated system of the storage system 250 allows the user to take pre-defined actions.

In certain embodiments, such a pre-defined action is one that does not impact data integrity, such as an alert that requires only acknowledgement and not a direct action. For example, a simple action may be an over-temperature condition that requires acknowledgment. In certain embodiments, the verification module 440 requires an acknowledgement action (e.g., press #key for yes) to ensure the user does not inadvertently acknowledge the condition.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5B:
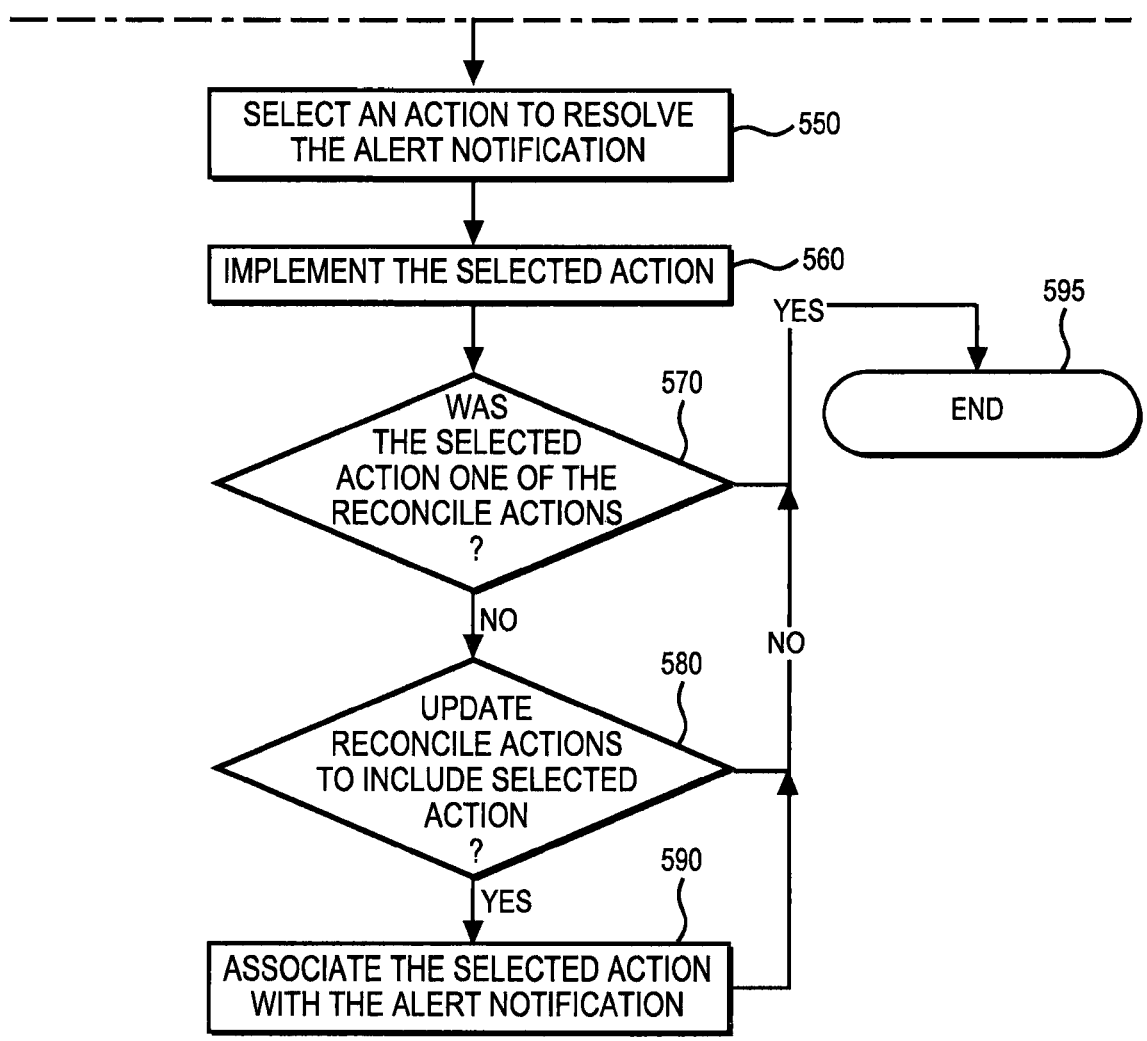
FIG. 5B is a flow chart summarizing additional steps in one embodiment of Applicants' method.

FIGS. 5A and 5B illustrate an embodiment of Applicants' method to provide alert notification (e.g., alert message) with a reconcile action (e.g., corrective course of action). Referring to FIG. 5A, in step 505 the method provides a client computing system, a target computing system, and a notification module, such as and without limitation notification module 400 (FIG. 4), in communication with both the client system and the target system. In certain embodiments, the target computing system comprises a storage controller in communication with a plurality of data storage devices. In certain embodiments, the notification module is integral with the target computing system. In certain embodiments, the notification module is integral with a storage system. In certain embodiments, the notification module is integral with one or more data storage devices.

In step 510, the method generates an alert notification. In certain embodiments, the alert notification of step 510 is directed to a condition detected in the target computing system of step 505. In certain embodiments, the alert notification of step 510 is directed to an error condition detected in a storage system. In certain embodiments, the alert notification of step 510 is directed to an error condition detected in one or more data storage devices.

In certain embodiments, step 510 is performed by a processor, such as processor 162 and/or processor 182, disposed in the target computing system. In certain embodiments, steps 510 is performed by a processor, such as processor 410, disposed in a notification module.

In step 520, the method provides the alert notification of step 510 to the client system of step 505. In certain embodiments, step 520 is performed by a communication module 420 disposed in notification module 400. In certain embodiments, the method interacts with the network/communication features of the client application 125 to communicate with the target system 150 over fabric 130. The method may receive the alert notification 174 by registering with the client application 125 and by using a protocol to exchange data relating to events, errors, problems, and/or tasks (job tasks, storage task, management tasks, etc.) in the target system 150.

In certain embodiments, the method performs step 520 by interacting with and enhancing service features of the client application 125. The service features are used to notify a user of an error condition in target system 150. For example, the client application 125 may include a calendar and/or email application(s) having service features like scheduling, planning, notifying, and managing meetings, appointments, and job tasks. In step 520, the method uses these features of the client application 125 to notify a user of the alert notification.

For example in certain embodiments, the method generates an email message using the client's email application 125 to notify the user of the alert notification of step 510. In another embodiment, the method generates an alert message in the client's calendar application 125 to notify the user of the alert notification of step 510 needing immediate attention. In other embodiment(s), the method generates both the alert message in the calendar and the email message to notify the user of the event/error needing immediate attention on the target system 150. In certain embodiments, step 520 comprises providing an alert notification 174 which identifies the alert/problem/error, etc. occurring in target system 150.

In certain embodiments, step 520 is performed by the communication module 420, wherein the communication module 420 is executed by a processor in the client system 120. In certain embodiments, step 520 is performed by the communication module 420, wherein the communication module 420 is executed by a processor in the target system 150.

In step 530, the method determines whether to implement a security screen. In certain embodiments, step 530 is performed by the client computing system of step 505. In certain embodiments, step 530 is performed by a processor disposed in the target computing system of step 505. In certain embodiments, step 530 is performed by a host computer in communication with the client computing system and target computing system of step 505. In certain embodiments, step 530 is performed by a processor 410 (FIG. 4) using verification module 440 (FIG. 4).

If the method elects in step 530 to implement a security screen, then the method transitions to step 710 (FIG. 7). If the method elects in step 530 not to implement a security screen, then the method transitions from step 530 to step 540 wherein the method provides to the client computing system one or more reconcile actions associated with the alert notification of step 510. In certain embodiments, in step 540 the method immediately provides and displays an alert notification 174 in combination with a reconcile action(s) 164 on the client system 120. In certain embodiments, the reconcile action(s) 164 responds to an error condition occurring on the target system 150. In certain embodiments, the reconcile action(s) 164 comprises a suggested course of action(s) to respond to the error condition on the target system 150.

For example, in step 520 (FIG. 5B), the method may provide to a client computing device an alert notification 174 from the target system 150. The alert 174 may for example identify a error condition occurring on the target system 150. The event for example may be a temperature warning relating to the one or more components operating in target system 150. In step 540 (FIG. 5A) the method generates one or more reconcile actions 164 suggesting one or more corrective courses of action to address the problem. For example, the method may receive two reconcile actions in response to the temperature warning alert: Action One (1) may suggest reducing drive activity and Action Two (2) may suggest ignoring the temperature warning. The method in step 540 immediately provides (e.g., links the alert with the reconcile actions) and displays the alert (e.g., temperature alert) with the reconcile action(s) (e.g., Actions 1 and 2) in the client system 120 so that the user or system administrator may view both the alert with the reconcile action(s).

In certain embodiments, the method performs step 540 by interacting with and enhancing the client application's 125 service features to display the error condition along with the reconcile action. For example, the client application 125 may include a calendar and/or email application(s) having service features like scheduling, planning, notifying, alerting, and managing meetings, appointments, and job tasks. In step 540, the method uses these features of the client application 125 to immediately link and display the notification 174 along with the reconcile action(s) 164 to correct or fix the error/event 174.

In step 550 (FIG. 5B), the method selects a resolution action to resolve the error condition occurring on the target system 150. The selection of the resolution action may be based on a policy or may be selected by a user or system administrator using an input device of the client system 120. The input device may include, but is not limited to, a keyboard, mouse, display screen, touch screen, touchpad, pointer, etc. For example, the client system 120 may include a PDA with a touch screen. Because the method immediately links and displays the alert with the reconcile action(s) 164 in the notice of step 520, the user may immediately select in real time an appropriate resolution action when the alert message is displayed. For example, a user may select one of the two actions: Action 1 or Action 2 in the above example.

In other embodiments, the reconcile actions provided in step 540 may be ignored by a user, and that user may manually log into the system and manually configure the system to add a new reconcile action, and in step 550 the user may then select the newly added reconcile action of step 540.

In step 560 (FIG. 5B), the method implements the resolution action selected in step 550. In certain embodiments, step 560 is performed by the client computing system of step 505. In certain embodiments, step 560 is performed by the target computing system of step 505. In certain embodiments, step 560 is performed by a host computer in communication with both the client system and the target system.

In certain embodiments, step 560 is performed by the alert/action module 430, wherein the alert/action module 430 is executed by a processor in the client system 120. In certain embodiments, step 560 is performed by the alert/action module 430, wherein the alert/action module 430 is executed by a processor in the target system 120.

In step 570 (FIG. 5B), the method determines if the resolution action selected in step 550 comprises a newly added reconcile action manually entered by a user. In certain embodiments, step 570 is performed by the client computing system of step 505. In certain embodiments, step 570 is performed by the target computing system of step 505. In certain embodiments, step 570 is performed by a host computer in communication with both the client system and the target system. In certain embodiments, step 570 is performed by processor 410 using the alert/action module 430.

If the method determines in step 570 that the selected resolution action of step 550 comprises one or more of the reconcile actions provided in step 540, then the method transitions from step 570 to step 595 (FIG. 5B) and ends. Alternatively, if the method determines in step 570 that the selected resolution action of step 550 comprises a newly added reconcile action manually entered by a user, then the method transitions from step 570 to step 580 (FIG. 5B) wherein the method determines whether to update the reconcile actions of step 540 to include the newly added reconcile action manually entered by a user. In certain embodiments, step 580 (FIG. 5B) is manually performed by a system operator. In certain embodiments, step 580 is performed by the client computing system of step 505. In certain embodiments, step 580 is performed by the target computing system of step 505. In certain embodiments, step 580 is performed by a host computer in communication with both the client system and the target system. In certain embodiments, step 580 is performed by processor 410 using the alert/action module 430.

If the method elects in step 580 not to update the reconcile actions of step 540 to include the selected resolution action of step 550, then the method transitions from step 580 to step 595 (FIG. 5B) and ends. Alternatively, if the method elects in step 580 to update the reconcile actions of step 540 to include the newly added reconcile action manually entered by a user, then the method transitions from step 580 to step 590 (FIG. 5B) wherein the method updates a look-up table, and/or database, to associate the newly added reconcile action with the alert notification of step 510. In certain embodiments, step 590 is performed by the client computing system of step 505. In certain embodiments, step 590 is performed by the target computing system of step 505. In certain embodiments, step 590 is performed by a host computer in communication with both the client system and the target system. In certain embodiments, step 590 is performed by processor 410 using the alert/action module 430.

Figure 6B:
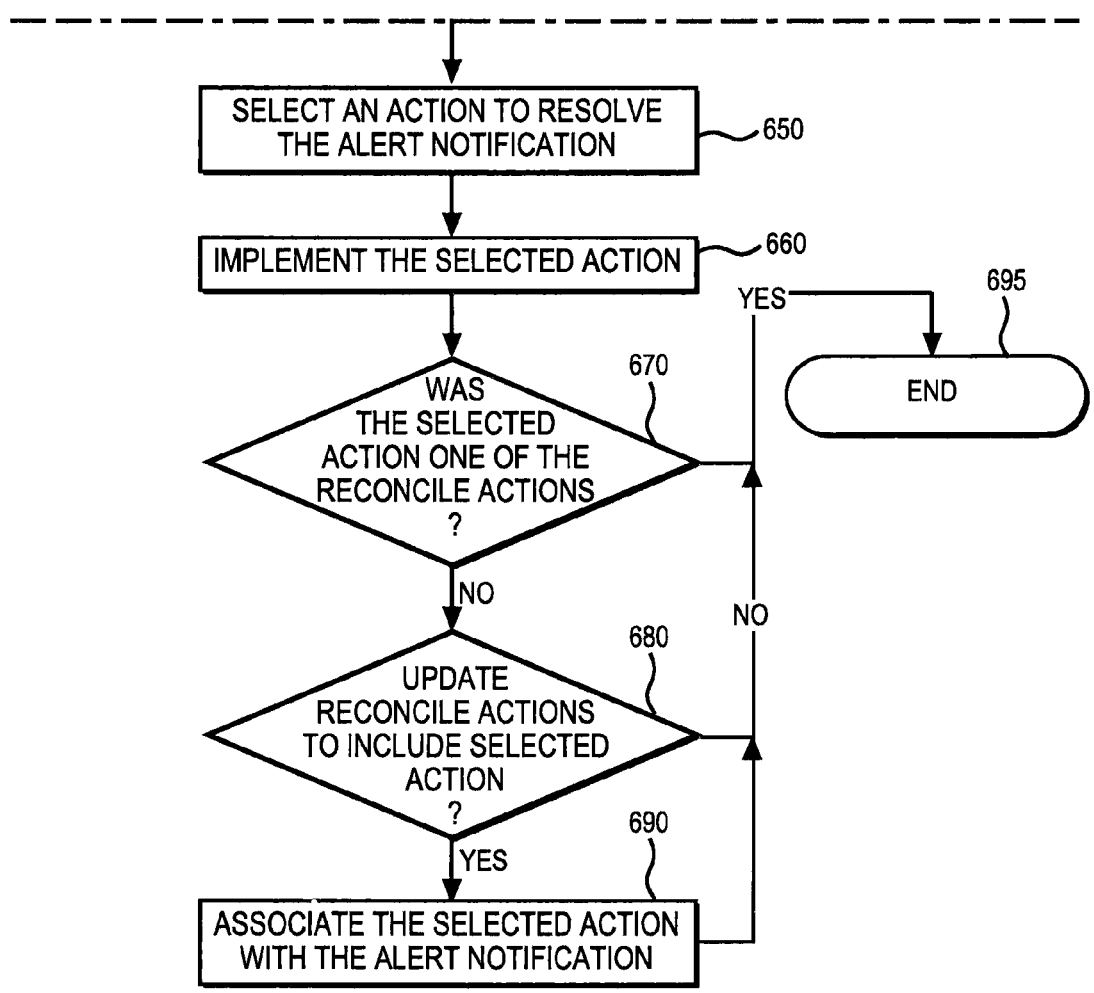
FIG. 6B is a flow chart summarizing additional steps in a second embodiment of Applicants' method.

FIGS. 6A and 6B illustrate a second embodiment of Applicants' method to provide alert notification (e.g., alert message) with a reconcile action (e.g., corrective course of action). The method of FIG. 6 may be implemented using any of computing systems 100, 200, or 300, using notification module 400.

Referring to FIG. 6A, in step 605 the method provides a client computing system, a target computing system, and a notification module, such as and without limitation notification module 400 (FIG. 4), wherein that notification module is in web-based communication with one or both the client system and the target system. In certain embodiments, the target computing system comprises a storage controller in communication with a plurality of data storage devices. In certain embodiments, the notification module is integral with the target computing system. In certain embodiments, the notification module is integral with a storage system. In certain embodiments, the notification module is integral with one or more data storage devices.

In step 610, the method generates an alert notification. In certain embodiments, the alert notification of step 610 is directed to a condition detected in the target computing system of step 605. In certain embodiments, the alert notification of step 610 is directed to an error condition detected in a storage system. In certain embodiments, the alert notification of step 610 is directed to an error condition detected in one or more data storage devices.

In certain embodiments, step 610 is performed by a processor, such as processor 162, and/or processor 172, and/or processor 182, disposed in the target computing system. In certain embodiments, step 610 is performed by a processor, such as processor 410, disposed in a notification module.

In step 620 (FIG. 6A), the method provides the alert notification of step 610 to a web feed link disposed in the client system of step 605. In certain embodiments in step 610, the method establishes a web feed, such as an RSS or Atom feed link, by subscribing to a web syndication service, such as RSS service, provided by the target system 150. For example, the method subscribes to a notification service provided by the target system 150 using the RSS feed link 124.

In certain embodiments, in step 620 the method sends alert notifications 174 to the client system 120 via RSS feed 280. The alert message(s) 174 includes a RSS file 184. In one embodiment, the storage system 250 sends the alert notifications 174, which includes the RSS file 184 (FIGS. 2-3).

Further in step 620, the method dynamically links with a web browser to display the alert condition along with the reconcile action(s) in the browser. For example, the method in step 625 (FIG. 6A) dynamically links with a drop down menu of a web browser 122 of the client system 120 to display the alert 174 with the reconcile action(s) 164. For example, using the above temperature alert example, in step 625, the method displays the temperature alert: "Enclosure temperature warning" with a reconcile action(s), such as Action 1: "reduce drive activity" and Action 2: "Mask alert" (e.g., ignore).

In certain embodiments, the method of FIGS. 6A and 6B use browser 122 to dynamically link and display the alert 174 with the reconcile action(s) 164, there may be a continues feeding of alert notifications174 from the target system 150 to the client system 120 while the browser 122 is open (i.e., executing). In certain embodiments, when browser 122 is closed, the continues feed may become disconnected and the method may transition to step 610 to reestablish an RSS feed link.

In certain embodiments, step 620 is performed by a communication module 420 disposed in notification module 400. In certain embodiments, the method interacts with the network/communication features of the client application 125 to communication with the target system 150 over fabric 130. The method may receive the alert notification 174 by registering with the client application 125 and by using a protocol to exchange data relating to events, errors, problems, and/or tasks (job tasks, storage task, management tasks, etc.) in the target system 150.

In certain embodiments, the method performs step 620 by interacting with and enhancing service features of the client application 125. The service features are used to notify a user of a problem, event, or error in target system 150. For example, the client application 125 may include a calendar and/or email application(s) having service features like scheduling, planning, notifying, and managing meetings, appointments, and job tasks. In step 620, the method uses these features of the client application 125 to notify a user of the alert notification.

In certain embodiments, step 620 is performed by the communication module 420, wherein the communication module 420 is executed by a processor in the client system 120. In certain embodiments, step 620 is performed by the communication module 420, wherein the communication module 420 is executed by a processor in the target system 150. In certain embodiments, step 620 is performed by the communication module 420, wherein the communication module 420 is executed by processor 410.

In step 630 (FIG. 6A), the method determines whether to implement a security screen. In certain embodiments, step 630 is performed by the client computing system of step 505. In certain embodiments, step 630 is performed by a processor disposed in the target computing system of step 505. In certain embodiments, step 630 is performed by a host computer in communication with the client computing system and target computing system of step 505. In certain embodiments, step 630 is performed by a processor 410 (FIG. 4) using verification module 440 (FIG. 4).

If the method elects in step 630 to implement a security screen, then the method transitions to step 710 (FIG. 7). If the method elects in step 630 not to implement a security screen, then the method transitions from step 630 to step 640 wherein the method provides to the client computing system one or more reconcile actions associated with the alert notification of step 610. In certain embodiments, in step 640 the method immediately provides and displays an alert notification 174 in combination with a reconcile action(s) 164 on the client system 120. In certain embodiments, the reconcile action(s) 164 responds to an error/event occurring on the target system 150. In certain embodiments, the reconcile action(s) 164 comprises a suggested course of action(s) to fix the error condition on the target system 150.

In step 640 (FIG. 6A), the method dynamically links with a web browser in the client computing system of step 605 to display the alert condition along with the reconcile action(s) in the browser. For example, the method in step 640 dynamically links with a drop down menu of a web browser 122 of the client system 120 to display the alert 174 with the reconcile action(s) 164. For example, using the above temperature alert example, in step 625, the method displays the temperature alert: "Enclosure temperature warning" with a reconcile action(s), such as Action 1: "reduce drive activity" and Action 2: "Mask alert" (e.g., ignore).

In step 650 (FIG. 6B), the method selects an action responsive to the error condition occurring on the target system 150. The selection of the resolution action may be based on a policy or may be selected by a user or system administrator using an input device of the client system 120. The input device may include, but is not limited to, a keyboard, mouse, display screen, touch screen, touchpad, pointer, etc. For example, the client system 120 may include a PDA with a touch screen. Because the method immediately links and displays the alert with the reconcile action(s) 164 in the notice of step 520, the user may immediately select in real time an appropriate resolution action when the alert message is displayed. For example, a user may select one of the two actions: Action 1 or Action 2 in the above example.

In other embodiments, the reconcile actions provided in step 640 may be ignored by a user, and that user may manually log into the system and manually configure the system to add a new reconcile action, and in step 650 the user may then select the newly added reconcile action of step 640.

In step 660 (FIG. 6B), the method implements the resolution action selected in step 650. In certain embodiments, step 660 is performed by the client computing system of step 605. In certain embodiments, step 660 is performed by the target computing system of step 605. In certain embodiments, step 660 is performed by a host computer in communication with both the client system and the target system.

In certain embodiments, step 660 is performed by the alert/action module 430, wherein the alert/action module 430 is executed by a processor in the client system 120. In certain embodiments, step 660 is performed by the alert/action module 430, wherein the alert/action module 430 is executed by a processor in the target system 120.

In certain embodiments, step 660 is performed by the alert/action module 430, wherein the alert/action module 430 is executed by a processor in the client system 120. In certain embodiments, step 660 is performed by the alert/action module 430, wherein the alert/action module 430 is executed by a processor in the target system 120.

In step 670 (FIG. 6B), the method determines if the resolution action selected in step 650 comprises a newly added reconcile action manually entered by a user. In certain embodiments, step 670 is performed by the client computing system of step 605. In certain embodiments, step 670 is performed by the target computing system of step 605. In certain embodiments, step 670 is performed by a host computer in communication with both the client system and the target system. In certain embodiments, step 670 is performed by processor 410 using the alert/action module 430.

If the method determines in step 670 that the selected resolution action of step 650 comprises one or more of the reconcile actions provided in step 640, then the method transitions from step 670 to step 695 (FIG. 6B) and ends. Alternatively, if the method determines in step 670 that the selected resolution action of step 650 comprises a newly added reconcile action manually entered by a user, then the method transitions from step 670 to step 680 (FIG. 6B) wherein the method determines whether to update the reconcile actions of step 640 to include the newly added reconcile action manually entered by a user. In certain embodiments, step 680 is manually performed by a system operator. In certain embodiments, step 680 is performed by the client computing system of step 605. In certain embodiments, step 680 is performed by the target computing system of step 605. In certain embodiments, step 680 is performed by a host computer in communication with both the client system and the target system. In certain embodiments, step 680 is performed by processor 410 using the alert/action module 430.

If the method elects in step 680 (FIG. 6B) not to update the reconcile actions of step 640 to include the selected resolution action of step 650, then the method transitions from step 680 to step 695 and ends. Alternatively, if the method elects in step 680 to update the reconcile actions of step 640 to include the newly added reconcile action manually entered by a user, then the method transitions from step 680 to step 690 wherein the method updates a look-up table, and/or database, to associate the newly added reconcile action with the alert notification of step 610. In certain embodiments, step 690 (FIG. 6B) is performed by the client computing system of step 605. In certain embodiments, step 690 is performed by the target computing system of step 605. In certain embodiments, step 690 is performed by a host computer in communication with both the client system and the target system. In certain embodiments, step 690 is performed by processor 410 using the alert/action module 430.

Referring now to FIG. 7, in step 710 the method receives security information entered by a user in the client computing system of step 505 or 605. In various embodiments, the security information entered in step 710 is selected from the group consisting of a userID, a password, a retinal scan, an iris scan, a fingerprint, a voice print, a bard-writing exemplar, and combinations thereof.

In step 720, the method determines if the proffered security information matches stored security information. In certain embodiments, step 720 is performed by verification module 440, wherein the verification module 440 is executed by a processor disposed in client system 120. In certain embodiments, step 720 is performed by verification module 440, wherein the verification module 440 is executed by a processor in the target system 150, or storage controller 250, or storage controller 350. In certain embodiments, step 720 is performed by processor 410 using verification module 440.

If the method determines in step 720 that the proffered security information of step 710 does not match stored security information, then the method transitions from step 720 to step 750 and ends. Alternatively, if the proffered security information of step 710 does match stored security information, then the method transitions from step 720 to step 730 wherein the method identifies a user associated with the proffered security information.

In certain embodiments, step 730 is performed by verification module 440, wherein the verification module 440 is executed by a processor disposed in client system 120. In certain embodiments, step 730 is performed by verification module 440, wherein the verification module 440 is executed by a processor in the target system 150, or storage controller 250, or storage controller 350. In certain embodiments, step 730 is performed by processor 410 using verification module 440.

In step 740, the method determines if the user identified in step 730 is authorized to implement a reconcile action associated with the alert notification of step 510 (FIG. 5) or step 610 (FIG. 6). In certain embodiments, one type of reconcile action 164 may only grant access to certain users while other types of reconcile actions 164 may grant access to a larger group of users. For example, a temperature warning alert may be associated with reconcile, actions that may be implemented by large group of users. In contrast, a data migration alert may be associated with reconcile actions that may be implemented by a smaller group of users.

In certain embodiments, step 740 is performed by verification module 440, wherein the verification module 440 is executed by a processor disposed in client system 120. In certain embodiments, step 740 is performed by verification module 440, wherein the verification module 440 is executed by a processor in the target system 150, or storage controller 250, or storage controller 350. In certain embodiments, step 740 is performed by processor 410 using verification module 440.

If the method determines in step 740 that the user identified in step 730 is not authorized to implement a reconcile action associated with the alert notification of step 510 (FIG. 5) or step 610 (FIG. 6), then the method transitions from step 740 to step 750 and ends. Alternatively, if the determines in step 740 that the user identified in step 730 is authorized to implement a reconcile action associated with the alert notification of step 510 (FIG. 5) or step 610 (FIG. 6), then if the method transitioned to step 710 from step 530 the method transitions from step 740 to step 540, or if the method transitioned to step 710 from step 630 the method transitions from step 740 to step 640.

In certain embodiments, individual steps recited in FIGS. 5, 6, and/or 7, may be combined, eliminated, or reordered.

In certain embodiments, Applicants' invention includes instructions, such as instructions 166, 186, and/or 474, residing in a computer readable medium wherein those instructions are executed by a processor, such as processor 162, 182, and/or 410 to perform one or more of steps 510, 520, 530, 540, 550, 560, 570, 580, and/or 590, recited in FIGS. 5A and 5B, and/or one or more of steps 610, 620, 630, 640, 650, 660, 670, 680, and/or 690, recited in FIGS. 6A and 6B, and/or one or more of steps 710, 720, 730, and/or 740, recited in FIG. 7.

In other embodiments, Applicants' invention includes instructions residing in any other computer program product, where those instructions are executed by a computer external to, or internal to, system 100, to perform one or more of steps 510, 520, 530, 540, 550, 560, 570, 580, and/or 590, recited in FIGS. 5A and 5B, and/or one or more of steps 610, 620, 630, 640, 650, 660, 670, 680, and/or 690, recited in FIGS. 6A and 6B, and/or one or more of steps 710, 720, 730, and/or 740, recited in FIG. 7. In either case, the instructions may be encoded in a computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide an alert notification and a reconcile action, comprising:
   supplying a client computing system and a target computing system comprising a storage controller in communication with a plurality of data storage drives, wherein:
   said target computing system is in communication with said client computing system;
   said target computing system comprises a communication module, and a management module;
   said communication module comprises a first computer readable medium, and a plurality of notification messages encoded in said first computer readable medium;
   said management module comprises a processor, a second computer readable medium, and a plurality of reconcile action encoded in said second computer readable medium;
   providing by said target computing system to said client computing system an enclosure temperature warning alert notification responsive to an error condition and two reconcile actions responsive to the error condition, wherein one a first reconcile action comprises ignoring said error condition and wherein a second reconcile action comprises reducing drive activity;
   selecting a reconcile action by said client computing system;
   implementing said selected reconcile action by said target computing system;
   wherein said implementing step is performed without logging into said target computing system.

2. The method of claim 1, wherein said error condition comprises an over-temperature condition detected in said target computing system.

3. The method of claim 1, wherein:
   said target computing system comprises a storage controller in communication with one or more data storage devices;
   said error condition comprises a failure to read information from, or write information to, one or more of said plurality of data storage devices.

4. The method of claim 1, wherein said selecting step comprises selecting a resolution action that differs from said reconcile action, said method further comprising updating said reconcile action to include to said resolution action.

5. The method of claim 1, further comprising:
   providing a notification module comprising said communication module, wherein said notification module is in communication with said client computing system and with said target computing system.

6. The method of claim 5, wherein said notification module is integral with said target computing system.

7. The method of claim 5, further comprising supplying a communication fabric comprising one or more switches;
   wherein said client computing system communicates with said target computing system via said communication fabric; and
   wherein said notification module communicates with said client computing system and with said target computing system via said communication fabric.

8. The method of claim 5, further comprising:
   submitting security information;
   determining if said submitted security information matches stored security information;
   operative if said submitted security information does not match said stored security information, not providing said reconcile action to said client computing device.

9. The method of claim 8, further comprising:
   operative if said submitted security information matches said stored security information:
   identifying a user associated with said submitted security information; and
   determining if said user is authorized to implement said reconcile action;
   operative if said user is not authorized to implement said reconcile action, not providing said reconcile action to said client computing device.

10. A system comprising a notification module in communication with a client computing system and disposed in a target computing system comprising a storage controller in communication with a plurality of data storage drives, and comprising a processor and a computer readable medium having computer readable program code disposed therein to generate and provide an alert notification responsive to an error condition and one or more reconcile actions responsive to the alert notification, wherein the target computing system comprises a management module comprising a plurality of reconcile actions encoded therein, the computer readable program code comprising a series of computer readable program steps to effect:
   forming an enclosure temperature warning alert notification responsive to an error condition in said target computing system;
   generating two reconcile actions responsive to said error condition, wherein one a first reconcile action comprises ignoring said error condition and wherein a second reconcile action comprises reducing drive activity;
   providing said alert notification and said reconcile actions to said client computing system;
   receiving a selected reconcile action from said client computing system;
   implementing said selected reconcile action by said target computing system;
   wherein said implementing step is performed without logging into said target computing system.

11. The system of claim 10, wherein said error condition comprises an over-temperature condition detected in said target computing system.

12. The system of claim 10, wherein:
said target computing system comprises a storage controller in communication with one or more data storage devices;
said error condition comprises a failure to read information from, or write information to, one or more of said plurality of data storage devices.

13. The system of claim 10, wherein said computer readable program code to received a selected action further comprises a series of computer readable program steps to effect receiving a resolution action that differs from said reconcile action, said computer readable program code further comprising a series of computer readable program steps to effect updating said reconcile action to include to said resolution action.

14. The system of claim 10, further comprising:
an alert module and a communication module;
wherein said alert module comprises computer readable program code comprising a series of computer readable program steps to effect forming said alert notification; and
wherein said communication module comprises computer readable program code comprising a series of computer readable program steps to effect providing said alert notification and said reconcile action to said client computing system.

15. The system of claim 10, wherein said notification module is integral with said target computing system.

16. The system of claim 10, wherein said notification module communicates with said client computing system and with said target computing system via a communication fabric.

17. The system of claim 10, said computer readable program code further comprising a series of computer readable program steps to effect:
receiving security information;
determining if said received security information matches stored security information;
operative if said received security information does not match said stored security information, not providing said reconcile action to said client computing device.

18. The system of claim 17, said computer readable program code further comprising a series of computer readable program steps to effect:
operative if said received security information matches said stored security information:
identifying a user associated with said submitted security information; and
determining if said user is authorized to implement said reconcile action;
operative if said user is not authorized to implement said reconcile action, not providing said reconcile action to said client computing device.

19. A computer program product encoded in a non-transitory computer readable medium disposed in a notification module comprising a programmable processor and in communication with a client computing system and disposed in a target computing system comprising a storage controller in communication with a plurality of data storage drives, said computer program product being useable with said programmable processor to generate and provide an alert notification responsive to an error condition and one or more reconcile actions responsive to the alert notification, wherein the target computing system comprises a management module comprising a plurality of reconcile actions encoded therein, and wherein said computer readable medium is selected from the group consisting of a magnetic information storage medium, an optical information storage medium, an electronic information storage medium, comprising:
computer readable program code which causes said programmable processor to form an enclosure temperature warning alert notification responsive to an error condition in said target computing system;
computer readable program code which causes said programmable processor to generate two reconcile actions responsive to said error condition, wherein one a first reconcile action comprises ignoring said error condition and wherein a second reconcile action comprises reducing drive activity;
computer readable program code which causes said programmable processor to provide said alert notification and said two reconcile actions to said client computing system;
computer readable program code which causes said programmable processor to receive a selected reconcile action from said client computing system;
wherein said selected reconcile action is implemented by said target computing system without requiring that a user log into said target computing system.

20. The computer program product of claim 19, wherein said error condition comprises an over-temperature condition detected in said target computing system.

21. The computer program product of claim 19, wherein:
said target computing system comprises a storage controller in communication with one or more data storage devices;
said error condition comprises a failure to read information from, or write information to, one or more of said plurality of data storage devices.

22. The computer program product of claim 19, wherein said notification module communicates with said client computing system and with said target computing system via a communication fabric.

23. The computer program product of claim 19, wherein said notification module is integral with said target computing system.

24. The computer program product of claim 19, further comprising:
computer readable program code which causes said programmable processor to receive security information;
computer readable program code which causes said programmable processor to determine if said received security information matches stored security information;
computer readable program code which, if said submitted security information does not match said stored security information, causes said programmable processor to not provide said reconcile action to said client computing device.

25. The computer program product of claim 24, said computer readable program code further comprising a series of computer readable program steps to effect:
computer readable program code which, if said submitted security information matches said stored security information causes said programmable processor to:
identify a user associated with said submitted security information; and
determine if said user is authorized to implement said reconcile action;
computer readable program code which, if said user is not authorized to implement said reconcile action, causes said programmable processor to not provide said reconcile action to said client computing device.

* * * * *